United States Patent Office 3,156,499
Patented Nov. 10, 1964

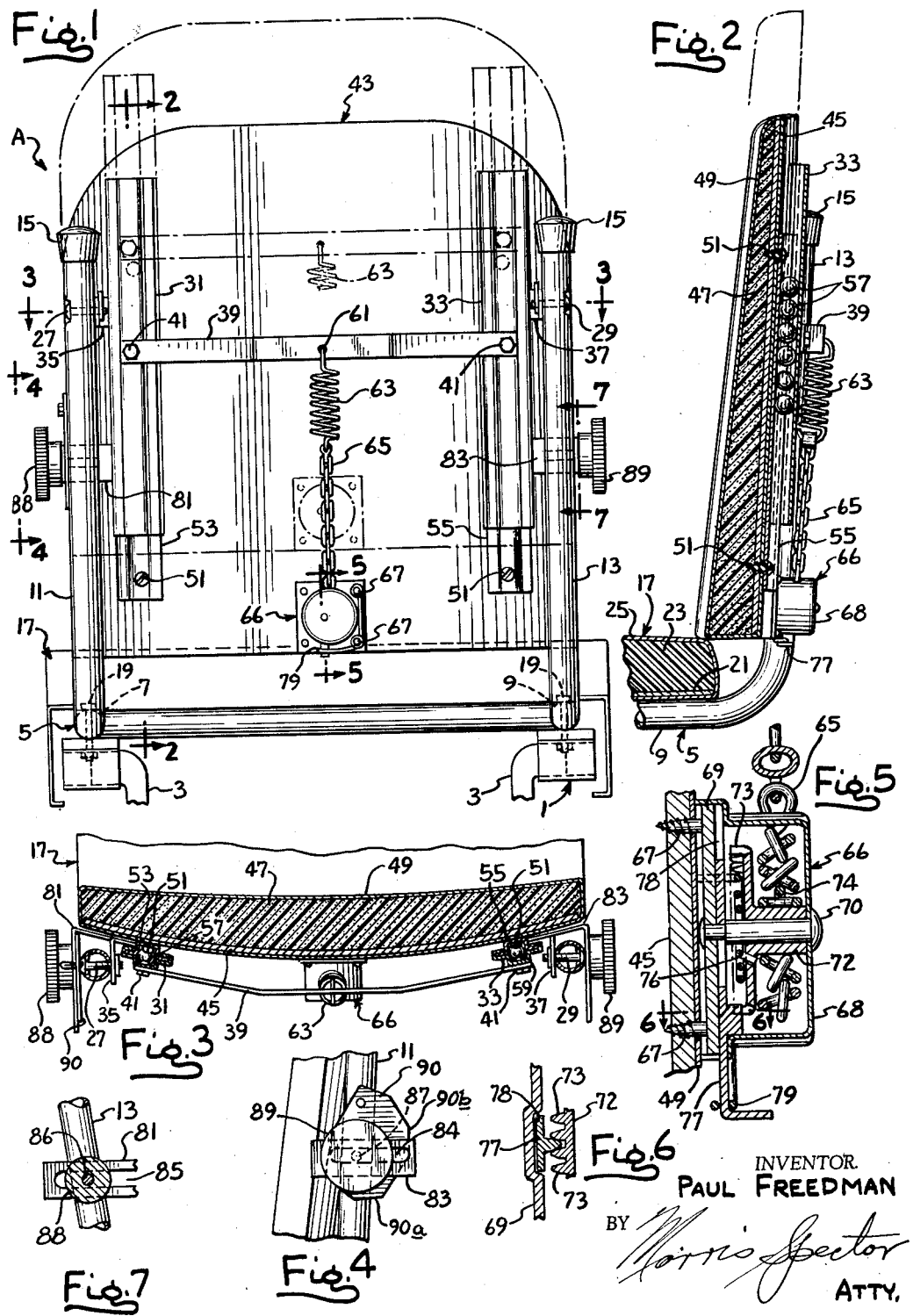

3,156,499
VEHICLE SEAT
Paul Freedman, 1825 W. Newport Ave., Chicago, Ill.
Filed May 14, 1962, Ser. No. 194,553
8 Claims. (Cl. 297—307)

This invention relates in general to seats, and, more particularly, to improvements in automobile seats.

In trucks and buses, the driver's seat is generally supported on a resilient seat suspension to absorb road shocks transmitted through the vehicle body and frame. One such seat is shown in my copending application, Serial No. 38,244, filed June 23, 1960, now Patent No. 3,075,736, and to which reference may be had. The seats generally have a resilient seat rest, and a back rest which may be set by the driver in a desired fixed angular position relative to the seat rest. When the driver is sitting on the seat with the vehicle in motion, some of the road shock is transmitted to the seat pad and, due to its resiliency, the driver's body is caused to move up and down relative to the back rest. If the driver's back is resting on the back rest repeated movement of this type causes discomfort due to rubbing against the back rest, resulting in increased driver fatigue.

It is an object of the present invention to provide a seat, especially a driver's seat for a truck or bus, wherein the back rest is "floating" in that it is movable up and down with the driver as the latter's body moves up and down on the seat rest with his back on the back rest, thereby increasing comfort to the driver during his operation of the vehicle.

It is a further object of the present invention to provide a seat of the type stated in which the back rest may be adjusted by the driver, when sitting on the seat, to any of a plurality of normal positions above the seat rest to place the back rest in the normal position most comfortable to the driver.

It is also an important object of the present invention to provide a seat of the type stated in which movement of the back rest from each normal position is opposed by a spring, whereby the back rest is urged toward its normal position when it is displaced therefrom.

The attainment of the above and further objects of the present invention will be apparent from the following specification taken in conjunction with the accompanying drawing forming a part thereof.

In the drawing:

FIG. 1 is a fragmentary rear elevational view of a vehicle seat constructed in accordance with and embodying the present invention;

FIGS. 2 and 3 are fragmentary sectional views taken along the lines 2—2 and 3—3 respectively of FIG. 1;

FIG. 4 is a fragmentary side elevational view as seen from line 4—4 of FIG.1;

FIG. 5 is a fragmentary sectional view, on an enlarged scale, taken along line 5—5 of FIG. 1;

FIG. 6 is a fragmentary sectional view taken along line 6—6 of FIG. 5; and

FIG. 7 is a fragmentary sectional view taken along line 7—7 of FIG. 1.

Referring now in more detail and by reference characters to the drawing, which illustrates the preferred embodiment of the present invention, A designates a seat comprising a resilient seat suspension 1 that may include a plurality of torsion spring assemblies 3. One such resilient seat suspension is shown in my aforementioned copending application. Rigidly mounted on the upper end of the resilient suspension 1 is a tubular frame 5 having opposed sides 7, 9. At the rear of the seat, the sides 7, 9 curve upwardly in the provision of upstanding arms 11, 13, the upper ends of which are closed off with plastic caps 15, 15.

A seat rest 17 is secured to the frame sides 7, 9 by a plurality of bolts 19 which may also be used to secure the sides 7, 9 to the suspension 1. The seat rest 17 includes a rigid base panel 21, a relatively thick layer of resilient padding 23, such as foam rubber, and an outer cover sheet 25 of a suitable material such as a vinyl resin plastic.

Projecting diametrally through the arms 11, 13 near their upper ends are axially aligned pivot-forming bolts 27, 29 that pivotally support a pair of track-forming channels 31, 33. Each of the channels 31, 33 has a bracket 35, 37 welded thereto and extending laterally therefrom and through which the pivotal connections with the pivot bolts 27, 29 are made. Secured to the channels 31, 33 approximately midway between their upper and lower ends by bolts 41 is a cross bar 39.

A back rest 43 is mounted for sliding movement along the channels 31, 33. This back rest 43 has a rigid back board 45 which supports a thick layer of resilient back rest padding 47, similar to the padding 23. The board 45 and padding 47 are covered with a plastic cover sheet 49 that is similar to the seat rest cover sheet 25. Secured to the back board 45 by a plurality of screws 51 are channels 53, 55 which are embraced by and slide along and within the channels 31, 33, thereby enabling the back rest 43 to move upwardly and downwardly along the channels 31, 33 independently of any movement of the seat rest 17. A plurality of anti-friction ball bearings 57, 59 may be interposed between the respective channels 31, 33, 53, 55.

Somewhat centrally thereof the cross bar 39 has a hole 61 for receiving one end of a coil tension spring 63 the other end of which is connected to an end of a chain 65. The chain 65 is, in turn, connected to a combined take-up and catch mechanism, generally designated at 66. The mechanism 66 is located at the lower end of the back rest 43 and is secured thereto by a plurality of screws 67.

The mechanism 66 comprises a housing 68 and a plate 69 which are held together by a rivet 70. The chain 65 projects into the housing 68 and a wheel 72, journalled on the rivet 70 and having peripheral teeth 73, has a hook 74 for receiving an end of the chain 65. As the wheel 72 rotates, the chain 65 is wound up or unwound therefrom, depending upon its direction of rotation. A spring 76, surrounding the rivet 70 and connected to the wheel 72 and plate 69, tends to urge the wheel in a direction to wind up the chain 65. A catch bar 77, slidable in a slot 78 in the plate 69, projects downwardly from the housing 68. This catch bar 77 is selectively movable upwardly and downwardly to engage or disengage the teeth 73 and prevent or permit rotation of the wheel 72, as the case may be. A wire spring 79 is secured in place by two of the screws 67, 67 and engages the catch bar 77 to urge it downwardly into engagement with the teeth 73.

The seat and back rest 17 and 43 are movable together as some of the road shock from the moving vehicle is taken up by the suspension 1. However, due to the resiliency of the seat rest 17, the vehicle driver's body will move upwardly and downwardly thereon, often with the driver's back against the back rest 43. The floating or sliding mounting of the back rest 43 prevents discomfort due to the driver's back rubbing against the back rest 43. The downward movement of the back rest 43 is opposed by the spring 63 which tends to bring the back rest 43 back to its normal or "at rest" position. Upward movement of the back rest 43 need not be spring opposed since the back rest 43 may be returned to its normal position by gravity.

The normal position of the back rest 43 above the seat rest 17 may be readily adjusted by the driver when he is sitting on the seat. By pushing upwardly on the catch bar 77 and grasping the back rest 43, the latter may be raised from its lowermost normal position, shown in full lines in the drawing, to its uppermost normal position, as shown in broken lines in FIGS. 1 and 2 or to any normal position therebetween, as is found to be most comfortable to the driver.

When changing normal positions the spring 76 turns the wheel 72 to take up the slack in the chain 65 and shorten its effective length. It should be noted that the spring 76 only takes up the chain slack since it is considerably weaker than the spring 63.

It should also be noted that when the back rest 43 is in its lowermost position, as shown in full lines in the drawing, the back rest 43 will be able to undergo little or no downward movement due to the fact that it abuts the seat rest 17.

The back rest 43 may also be tilted about the aligned pivot axis of the bolts 27, 29. To this end lower brackets 81, 83 are rigidly joined to the channels 31, 33, and extend backwardly along the outside of the arms 11, 13. The brackets 81, 83 include slots 84, 85 for receiving the threaded shanks 86, 78 of knobs 88, 89. On the threaded shank 87 adjacent to the bracket 83 is a cam plate 90 having a plurality of edges 90a, 90b, etc. which are at varying radial distances from the shank 87.

With the knobs 88, 89 loosened, the back rest 43 may be tilted about the pivot axis of the bolts 27, 29, whereupon the selected cam edge 90a, 90b, etc. as desired, may be placed against the bracket 83, depending upon the desired angularity of the back rest 43. The knobs 88, 89 are then tightened to secure the back rest in that position. As the back rest is tilted, the channels 31, 33 and channels 53, 55 are likewise tilted so that the "floating" mounting of the back rest is effective in all of its positions of angular adjustment.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A seat comprising a resilient seat rest, a back rest, means for mounting the back rest for shifting movement from a normal position downwardly and upwardly relative to the seat rest, whereby when a person is sitting on the seat rest with his back on the back rest, the back rest may move upwardly and downwardly with the person as the person moves upwardly and downwardly on the resilient seat rest, means for opposing the downward movement of the back rest, and means including a releasable catch mechanism movable with the back rest and operable by a person sitting on the seat for adjusting selectively the normal position of the back rest upwardly and downwardly relative to the seat rest to select any one of a plurality of normal positions for the back rest.

2. A seat comprising a resilient seat rest, a back rest, means for mounting the back rest for shifting movement from a normal position downwardly and upwardly relative to the seat rest, whereby when a person is sitting on the seat rest with his back on the back rest, the back rest may move upwardly and downwardly with the person as the person moves upwardly and downwardly on the resilient seat rest, means for opposing the downward movement of the back rest, and means operable by a person sitting on the seat for adjusting selectively the normal position of the back rest upwardly and downwardly relative to the normal position of the seat rest to select any one of a plurality of normal positions for the back rest.

3. A vehicle seat comprising a frame, a resilient seat rest mounted on the frame, said frame extending upwardly from the rear end of the seat rest, upwardly extending slide-forming means mounted on the upwardly extended portion of the frame, a back rest slidably mounted on the slide-forming means and being movable from any one of a plurality of normal positions downwardly and upwardly along the slide-forming means, spring means opposing the downward movement of the back rest from each normal position, and releasable means including a mechanism movable with the back rest and connected to the spring means and operable by a person sitting on the seat for preselecting the normal position of the back rest.

4. A vehicle seat comprising a frame, a resilient seat rest mounted on the frame, said frame extending upwardly from the rear end of the seat rest, upwardly extending slide-forming means pivotally mounted on the upwardly extended portion of the frame for movement to a plurality of selected angles to the horizontal, means for securing the slide-forming means rigidly to the frame at the selected angle, an upwardly projecting back rest slidably mounted on the slide-forming means and being movable from any one of a plurality of normal positions downwardly and upwardly along the slide-forming means, spring means opposing the downward movement of the back rest from each normal position, and releasable means operable by a person sitting on the seat for preselecting said normal position of the back seat.

5. A vehicle seat according to claim 4 wherein the releasable means includes a catch mechanism on the back rest adjacent to the lower end thereof and wherein means form an operative connection between the spring means and catch mechanism.

6. A seat comprising a resilient seat rest, a back rest, means for mounting the back rest for shifting movement from a normal position downwardly and upwardly relative to the seat rest, whereby when a person is sitting on the seat rest with his back on the back rest, the back rest may move upwardly and downwardly with the person as the person moves upwardly and downwardly on the resilient seat rest, spring means for opposing the downward movement of the back rest, and means for adjusting selectively the normal position of the back rest upwardly and downwardly relative to the seat rest to select any one of a plurality of normal positions for the back rest, said last named means including a releasable catch mechanism operable by a person sitting on the seat, and means forming an operative connection between the catch mechanism and the spring means.

7. A seat comprising a resilient seat rest, a back rest, means for mounting the back rest for shifting movement from a normal position downwardly and upwardly relative to the seat rest so that when a person is sitting on the seat rest with his back on the back rest the back rest may move upwardly and downwardly as the person moves upwardly and downwardly on the resilient seat rest, spring means for opposing the downward movement of the back rest, and means for adjusting selectively the normal position of the back rest upwardly and downwardly relative to the seat rest to select any one of a plurality of normal positions for the back rest; said last named means including a releasable catch mechanism mounted on the back rest and operable by a person sitting on the seat, means forming a housing for said mechanism, means projecting into said housing and forming a flexible connection between the mechanism and the spring means, and means forming part of said mechanism for taking up the slack in said flexible connecting means as the back rest is adjusted to various normal positions.

8. A seat comprising a resilient seat rest, a back rest, means for mounting the back rest for shifting movement from a normal position downwardly and upwardly relative to the seat rest so that when a person is sitting on the seat rest with his back on the back rest the back rest may move upwardly and downwardly as the person moves upwardly and downwardly on the resilient seat rest, said back rest mounting means including a pair of spaced members upon which the back rest is slidable, means for adjusting selectively the normal position of the back rest upwardly and downwardly relative to the seat rest and back rest mounting means to select any one of a plurality of normal positions for the back rest, spring means joined to said back rest mounting means and adjusting means for supporting the back rest in the various normal positions and for opposing the downward movement of said back rest, said adjusting means including a releasable catch mechanism mounted on the back rest and operable by a person sitting on the seat, means forming a housing for said mechanism, means projecting into said housing and forming a flexible connection between the mechanism and the spring means, and means forming part of said mechanism for taking up the slack in said flexible connecting means as the back rest is adjusted to various normal positions; and means upon which said mounting means is pivotally secured for adjusting the angular position of the back rest and frame relative to the seat rest independently of the selected normal position.

References Cited in the file of this patent
UNITED STATES PATENTS

| | | |
|---|---|---|
| 1,767,757 | Harris | June 24, 1930 |
| 2,605,813 | Seitz | Aug. 5, 1952 |
| 2,638,150 | May | May 12, 1953 |
| 2,650,646 | Herold | Sept. 1, 1953 |
| 2,856,984 | Simons | Oct. 21, 1958 |
| 2,978,013 | McIntyre | Apr. 4, 1961 |